United States Patent [19]

Hordon et al.

[11] Patent Number: 5,084,301
[45] Date of Patent: Jan. 28, 1992

[54] ALLOYING AND COATING PROCESS

[75] Inventors: Monroe J. Hordon, Pittsford; Lawrence E. Kowalczyk, Penfield, both of N.Y.

[73] Assignee: Xerox Corporation, Stamford, Conn.

[21] Appl. No.: 576,919

[22] Filed: Sep. 4, 1990

[51] Int. Cl.$^5$ .................................................. B05D 5/06
[52] U.S. Cl. ............................................ 427/69; 75/340; 420/579; 420/580; 427/250; 427/255.7; 427/294; 427/404
[58] Field of Search .................. 427/69, 250, 255.7, 427/294, 404, 75/340; 420/579, 580

[56]  References Cited
U.S. PATENT DOCUMENTS

| | | | |
|---|---|---|---|
| 3,723,105 | 3/1973 | Kitajima et al. | 75/134 H |
| 3,785,806 | 1/1974 | Henriksson | 75/134 H |
| 4,414,179 | 9/1983 | Robinette | 420/579 |
| 4,484,945 | 11/1984 | Badesta et al. | 75/0.5 A |
| 4,583,608 | 4/1986 | Field et al. | 148/1 |
| 4,822,712 | 4/1989 | Foley et al. | 430/128 |

Primary Examiner—Bernard Pianalto
Attorney, Agent, or Firm—Judith L. Byorick

[57] ABSTRACT

Disclosed is an alloying process which comprises, in the order stated (1) heating in a reaction vessel a mixture of selenium and tellurium from ambient temperature to form about 270° C. to about 330° C. while maintaining the mixture in a quiescent state; (2) maintaining the mixture at from about 270° C. to about 330° C. until the entire mixture has reached substantial equilibrium with respect to temperature while maintaining the mixture in a quiescent state; (3) subsequently heating the mixture from the range of from about 270° C. to about 330° C. to the range of from about 500° C. to about 580° C. while maintaining the mixture in a quiescent state; (4) maintaining the mixture at from about 500° C. to about 580° C. until the entire mixture has reached substantial equilibrium with respect to temperature while maintaining the mixture in a quiescent state; (5) thereafter maintaining the mixture at from about 500° C. to about 580° C. for from about 0.75 hour to about 1.5 hours while vigorously agitating the mixture; (6) subsequent to agitation, reducing the temperature of the mixture from the range of from about 500° C. to about 580° C. to the range of from about 425° C. to about 450° C. while maintaining the mixture in a quiescent state; (7) subsequently maintaining the temperature of the mixture at from about 425° C. to about 450° C. for from about 4 hours to about 7 hours while maintaining the mixture in a quiescent state; (8) reducing the temperature of the mixture from the range of from about 425° C. to about 450° C. to the range of from about 290° C. to about 350° C. while maintaining the mixture in a quiescent state; and (9) removing the mixture from the reaction vessel. Also disclosed is a process for preparing an imaging member which comprises preparing a selenium-tellurium alloy by the above process and vacuum evaporating the alloy onto a substrate.

17 Claims, No Drawings

ALLOYING AND COATING PROCESS

BACKGROUND OF THE INVENTION

The present invention relates to a process for preparing alloys. More specifically, the present invention is directed to a process for preparing alloys of selenium and tellurium. One embodiment of the present invention is directed to an alloying process which comprises, in the order stated (1) heating in a reaction vessel a mixture of selenium and tellurium from ambient temperature to from about 270° C. to about 330° C. while maintaining the mixture in a quiescent state; (2) maintaining the mixture at from about 270° C. to about 330° C. until the entire mixture has reached substantial equilibrium with respect to temperature while maintaining the mixture in a quiescent state; (3) subsequently heating the mixture from the range of from about 270° C. to about 330° C. to the range of from about 500° C. to about 580° C. while maintaining the mixture in a quiescent state; (4) maintaining the mixture at from about 500° C. to about 580° C. until the entire mixture has reached substantial equilibrium with respect to temperature while maintaining the mixture in a quiescent state; (5) thereafter maintaining the mixture at from about 500° C. to about 580° C. for from about 0.75 hour to about 1.5 hours while vigorously agitating the mixture; (6) subsequent to agitation, reducing the temperature of the mixture from the range of from about 500° C. to about 580° C. to the range of from about 425° C. to about 450° C. while maintaining the mixture in a quiescent state; (7) subsequently maintaining the temperature of the mixture at from about 425° C. to about 450° C. for from about 4 hours to about 7 hours while maintaining the mixture in a quiescent state; (8) reducing the temperature of the mixture from the range of from about 425° C. to about 450° C. to the range of from about 290° C. to about 350° C. while maintaining the mixture in a quiescent state; and (9) removing the mixture from the reaction vessel.

The formation and development of images on the imaging surfaces of electrophotographic imaging members by electrostatic means is well known. One of the most widely used processes is xerography, described in, for example, U.S. Pat. No. 2,297,691 to Chester Carlson. Numerous different types of electrophotographic imaging members for xerography, i.e. photoreceptors, can be used in the electrophotographic imaging process. Such electrophotographic imaging members can include inorganic materials, organic materials, and mixtures thereof. Electrophotographic imaging members can comprise contiguous layers in which at least one of the layers performs a charge generation function and another layer forms a charge carrier transport function, or can comprise a single layer which performs both the generation and transport functions. These electrophotographic imaging members can also be coated with a protective overcoating to improve wear.

Electrophotographic imaging members based on amorphous selenium have been modified to improve panchromatic response, increase speed and to improve color copyability. These devices are typically based on alloys of selenium with tellurium and/or arsenic. The selenium electrophotographic imaging members can be fabricated as single layer devices comprising a selenium-tellurium, selenium-arsenic or selenium-tellurium-arsenic alloy layer which performs both charge generation and charge transport functions. The selenium electrophotographic imaging members can also comprise multiple layers such as, for example, a selenium alloy transport layer and a contiguous selenium alloy generator layer.

A common technique for manufacturing photoreceptor plates involves vacuum deposition of a selenium alloy to form an electrophotographic imaging layer on a substrate. Tellurium is incorporated as an additive for the purpose of enhancing the spectral sensitivity of the photoconductor. Arsenic is incorporated as an additive for the purpose of improving wear characteristics, passivating against crystallization, and improving electricals. Typically, the tellurium addition is incorporated as a thin selenium-tellurium alloy layer deposited over a selenium alloy base layer in order to achieve the benefits of the photogeneration characteristics of SeTe with the beneficial transport characteristics of SeAs alloys.

One method of preparing selenium alloys for evaporation is to grind selenium alloy shot (beads) and compress the ground material into pellet agglomerates, typically 150 to 300 milligrams in weight and having an average diameter of about 6 millimeters (6,000 microns). The pellets are evaporated from crucibles in a vacuum coater using a time/temperature crucible designed to minimize the fractionation of the alloy during evaporation.

U.S. Pat. No. 3,723,105 (Kitajima et al.), the disclosure of which is totally incorporated herein by reference, discloses a process for preparing selenium-tellurium alloys which comprises heating a mixture of selenium and tellurium containing 1 to 25 percent by weight of tellurium to a temperature not lower than 350° C. to melt the mixture, cooling the molten selenium and tellurium gradually to around the melting point of the selenium-tellurium alloy at a rate not higher than 100° C. per hour, and then quenching to room temperature within 10 minutes.

U.S. Pat. No. 4,822,712 (Foley et al.), the disclosure of which is totally incorporated herein by reference, discloses a process for controlling fractionation by crystallizing particles of an alloy of selenium which comprises providing particles of an alloy comprising amorphous selenium and an alloying component selected from the group consisting of tellurium, arsenic, and mixtures thereof, said particles having an average size of at least about 300 micrometers and an average weight of less than about 1,000 milligrams, forming crystal nucleation sites on at least the surface of the particles while maintaining the substantial integrity of the particles, heating the particles to at least a first temperature between about 50° C. and about 80° C. for at least about 30 minutes to form a thin, substantially continuous layer of crystalline material at the surface of the particles while maintaining the core of selenium alloy in the particles in an amorphous state, and rapidly heating the particles to at least a second temperature below the softening temperature of the particles, the second temperature being at least 20° C. higher than the first temperature and between about 85° C. and about 130° C. to crystallize at least about 5 percent by weight of the amorphous core of selenium alloy in the particles.

U.S. Pat. No. 4,583,608 (Field et al.), the disclosure of which is totally incorporated herein by reference, discloses heat treatment of single crystal superalloy particles. In one embodiment, single crystal particles are heat treated by using a heat treatment cycle during the initial stages of which incipient melting occurs within the particles being treated. During a subsequent step in heat treatment process substantial diffusion occurs in the particle. In a related embodiment, single crystal articles which have previously undergone incipient melting during a heat treatment process are prepared by a heat treatment process. In still another embodiment, a single crystal composition of various elements including chromium and nickel is treated to heating steps at various temperatures. In column 3, line 40 to 47, a stepped treatment cycle is employed in which an alloy is heated to a temperature below about 25° F. of an incipient melting temperature and held below the incipient melting temperature for a period of time sufficient to achieve a substantial amount of alloy homogenization.

U.S. Pat. No. 4,484,945 (Badesha et al.), the disclosure of which is totally incorporated herein by reference, discloses a process for preparing chalcogenide alloys by providing a solution mixture of oxides of the desired chalcogens and subsequently subjecting this mixture to a simultaneous coreduction reaction. Generally, the reduction reaction is accomplished at relatively low temperature, not exceeding about 120° C.

U.S. Pat. No. 4,414,179 (Robinette), the disclosure of which is totally incorporated herein by reference, discloses a process for preparing a selenium alloy comprising heating a mixture comprising selenium, arsenic and chlorine to a temperature between about 290° C. and about 330° C. to form a molten mixture, agitating the molten mixture to combine the components, continuing all agitation, raising the temperature of the mixture to at least 420° C. for at least about 30 minutes and cooling the mixture until it becomes a solid. This alloy may be vacuum deposited.

U.S. Pat. No. 3,785,806 (Henrickson), the disclosure of which is totally incorporated herein by reference, discloses a process for producing arsenic doped selenium by mixing finely divided selenium with finely divided arsenic in an atomic ratio of 1:4 and thereafter heating the mixture in an inert atmosphere to obtain a master alloy. The master alloy is then mixed with molten pure selenium to attain an arsenic content of between 0.1 and 2% by weight based on the selenium vaporizable alloying component on the substrate. Examples of vaporizable alloying components include selenium-sulfur and the like, and examples of vaporizable alloying components having relatively low vapor pressures which include tellurium, arsenic, antimony, bismuth, and the like. Examples of suitable evaporation retarding film materials include long chain hydrocarbon oils, inert oils, greases or waxes at room temperature which flow readily at less than the temperature of detectable deposition of the vaporizable alloying components having higher vapor pressures in the alloying mixture. Examples of retarding materials include lanolin, silicone oils such as dimethylpolysiloxane, branched or linear polyolefins such as polypropylene wax and polyalpha olefin oils, and the like. According to the teachings of this patent, optimum results are achieved with high molecular weight long chain hydrocarbon oils and greases generally refined by molecular distillation to have a low vapor pressure at the alloy deposition temperature.

Of background interest with respect to the preparation of selenium alloy photoresponsive imaging members are U.S. Pat. No. 4,780,386, U.S. Pat. No. 4,842,973, U.S. Pat. No. 4,894,307, U.S. Pat. No. 4,554,230, U.S. Pat. No. 4,205,098, U.S. Pat. No. 4,609,605, U.S. Pat. No. 4,297,424, U.S. Pat. No. 4,609,605, U.S. Pat. No. 4,297,424, U.S. Pat. No. 4,554,230, U.S. Pat. No. 4,205,098, U.S. Pat. No. 3,524,754, U.S. Pat. No. 4,205,098, U.S. Pat. No. 4,710,442, U.S. Pat. No. 4,585,621, U.S. Pat. No. 3,524,754, U.S. Pat. No. 4,015,029, U.S. Pat. No. 3,911,091, U.S. Pat. No. 4,710,442, and U.S. Pat. No. 4,513,031, the disclosures of each of which are totally incorporated herein by reference.

Although known materials and processes are suitable for their intended purposes, difficulties remain with selenium alloy photosensitive imaging members with respect to negative shock electrical residual voltage. Negative shock electrical residual voltage refers to the cumulative imaging member electrical residual voltage generated after alternating sequences of positive and negative charge cycling. When selenium alloy imaging members are repeatedly charged in successive imaging cycles, the residual voltage remaining on the member subsequent to discharge and prior to the next charging step tends to increase with each cycle, particularly when the cycles follow each other in rapid succession and the residual charge has no time to leak away prior to the next imaging step. It has been observed that when an alloy imaging member is charged first to one polarity, then to the opposite polarity, and subsequently to the first polarity, either with positive and negative charging being performed alternatively or with positive charging being performed for a set number of cycles, followed by negative charging for a number of cycles and then followed by positive charging again, the accumulation of residual voltage on the imaging member is significantly higher than that observed when the member is charged only to one polarity. This increase in residual voltage observed when the imaging member is charged to both polarities is referred to as negative shock electrical residual voltage. Excessive residual voltage build up in the imaging member with repeated cycling reduces the dark development potential of the member, since the difference in potential between the charged and discharged areas is reduced as a result of the increased residual voltage. Negative shock electrical residual voltage can induce image defects such as poor image contrast, undesirable development of background areas, black banding (the undesirable development of linear gray or black strips in background areas), and the like. Accordingly, a need remains for processes for preparing alloys of selenium that, when incorporated into an imaging member, reduce negative shock electrical residual voltage. A need also exists for processes for preparing alloys of selenium that, when incorporated into an imaging member, reduce image defects such as poor image contrast, background deposits, and black banding. Further, there is a need for processes for preparing imaging members that exhibit reduced negative shock electrical residual voltage and reduced image defects resulting therefrom. There is also a need for processes for preparing alloys of selenium that, when incorporated into an imaging member, reduce negative shock electrical residual voltage and reduce image defects while retaining good photosensitivity and dark development potential characteristics.

SUMMARY OF THE INVENTION

It is an object of the present invention to provide processes for preparing alloys of selenium that, when incorporated into an imaging member, reduce negative shock electrical residual voltage.

It is another object of the present invention to provide processes for preparing alloys of selenium that, when incorporated into an imaging member, reduce image defects such as poor image contrast, background deposits, and black banding.

It is yet another object of the present invention to provide processes for preparing imaging members that exhibit reduced negative shock electrical residual voltage and reduced image defects resulting therefrom.

It is still another object of the present invention to provide processes for preparing alloys of selenium that, when incorporated into an imaging member, reduce negative shock electrical residual voltage and reduce image defects while retaining good photosensitivity and dark development potential characteristics.

These and other objects of the present invention can be achieved by providing an alloying process which comprises, in the order stated (1) heating in a reaction vessel a mixture of selenium and tellurium from ambient temperature to from about 270° C. to about 330° C. while maintaining the mixture in a quiescent state; (2) maintaining the mixture at from about 270° C. to about 330° C. until the entire mixture has reached substantial equilibrium with respect to temperature while maintaining the mixture in a quiescent state; (3) subsequently heating the mixture from the range of from about 270° C. to about 330° C. to the range of from about 500° C. to about 580° C. while maintaining the mixture in a quiescent state; (4) maintaining the mixture at from about 500° C. to about 580° C. until the entire mixture has reached substantial equilibrium with respect to temperature while maintaining the mixture in a quiescent state; (5) thereafter maintaining the mixture at from about 500° C. to about 580° C. for from about 0.75 hour to about 1.5 hours while vigorously agitating the mixture; (6) subsequent to agitation, reducing the temperature of the mixture from the range of from about 500° C. to about 580° C. to the range of from about 425° C. to about 450° C. while maintaining the mixture in a quiescent state; (7) subsequently maintaining the temperature of the mixture at from about 425° C. to about 450° C. for from about 4 hours to about 7 hours while maintaining the mixture in a quiescent state; (8) reducing the temperature of the mixture from the range of from about 425° C. to about 450° C. to the range of from about 290° C. to about 350° C. while maintaining the mixture in a quiescent state; and (9) removing the mixture from the reaction vessel. Another embodiment of the present invention is directed to a process for preparing an imaging member which comprises preparing an alloy of selenium and tellurium by the aforementioned process and vacuum evaporating the alloy thus prepared onto a substrate to form an imaging member. Optionally, the imaging member can have one or more additional layers, situated between the layer of alloy prepared by the process of the present invention and the substrate and/or situated on top of the layer of alloy prepared by the process of the present invention.

The first step of the alloying process of the present invention entails mixing selenium and tellurium in a reaction vessel and heating the mixture from ambient temperature (typically from about 10° to about 35° C., although ambient temperature can be outside of this range) to from about 270° C. to about 330° C. (preferably about 300° C.). Selenium and tellurium, typically commercially available in bead or shot form, are mixed in relative amounts corresponding to the relative amounts of each element desired in the alloy. For the purpose of preparing electrophotographic imaging members, the alloy typically will comprise from about 5 to about 40 percent by weight of tellurium and from about 60 to about 95 percent by weight of selenium, and preferably comprises from about 10 to about 25 percent by weight tellurium and from about 75 to about 90 percent by weight of selenium. The selenium and tellurium can be mixed in any vessel suitable for preparation of selenium alloys, such as quartz vessels of any desired size (5 to 50 kilogram capacities being typical) or the like. The vessel can be heated by any suitable means, such as by a heating mantle or other resistive heating device situated around the vessel, or the like. The rate of heating will depend on many factors. For example, heating too rapidly can result in fracture of a quartz vessel. In addition, larger vessels will require longer heating times since heat is transferred more slowly to the contents of the vessel. While there is no maximum limit on the time for heating the mixture from ambient temperature to the range of from about 270° C. to about 330° C., economic and time factors generally favor minimizing the heating time. For a quartz vessel containing 50 kilograms of a selenium-tellurium mixture, typical heating times to bring the mixture from ambient temperature to from about 270° C. to about 330° C. are at least from about 40 minutes to about 1 hour (with 2 hours being a preferred heating time), although the time can be outside of this range provided that the objectives of the present invention are achieved. Smaller vessels and smaller amounts of material will not require as much time for heating. Heating occurs with the mixture maintained in a quiescent state. "Quiescent" as used herein refers to the absence of agitation.

Subsequent to the heating step, the mixture is maintained in a quiescent state at a temperature of from about 270° C. to about 330° C. (preferably about 300° C.) for a period of time sufficient for the portions of the mixture situated centrally in the vessel to achieve substantial temperature equilibrium with respect to the portions of the mixture situated near the walls of the vessel. While exact equilibrium is not required with respect to temperature between the central portions of the mixture and the portions situated near the walls, the entire mixture preferably should not exhibit a temperature range of more than about 30° C. between the central and outside portions at the end of this step. The time required to reach equilibrium will depend upon the size of the vessel and the amount of material in the vessel, with larger vessels and larger amounts of material requiring longer periods to achieve equilibrium. For example, for a quartz vessel containing 50 kilograms of selenium-tellurium mixture, temperature equilibrium typically can be reached in from about 40 minutes to about 1 hour, with 1 hour being a preferred equilibration time. While there is no maximum time limit for this step, economic and time factors generally favor minimizing the equilibrating time.

When the mixture has achieved substantial equilibrium with respect to temperature, the mixture is then heated from the range of from about 270° C. to about 330° C. to the range of from about 500° C. to about 580° C. while the mixture is maintained in a quiescent state. Preferably, the temperature is raised to about 540° C. Again, the rate of heating will depend on many factors, such as the size of the vessel, the amount of material, and economic and time considerations. For example, a quartz vessel containing 50 kilograms of mixture typically is heated over a period of at least 2.5 hours, with a preferred heating time being about 3 hours, although the time employed for heating can be less provided that the objectives of the present invention are achieved. Smaller vessels and smaller amounts of material will not require as much time for heating. While there is no maximum time limit for this step, economic and time factors generally favor minimizing the heating time.

After the mixture has reached a temperature of from about 500° C. to about 580° C., the mixture is maintained in a quiescent state at this temperature for a period of time sufficient for the portions of the mixture situated centrally in the vessel to achieve substantial temperature equilibrium with respect to the portions of the mixture situated near the walls of the vessel. Again, while exact equilibrium is not required with respect to temperature between the central portions of the mixture and the portions situated near the walls, the entire mixture preferably should not exhibit a temperature range of more than about 30° C. between the central and outside portions at the end of this step. The time required to reach equilibrium will depend upon the size of the vessel and the amount of material in the vessel, with larger vessels and larger amounts of material requiring longer periods to achieve equilibrium. For example, for a quartz vessel containing 50 kilograms of selenium-tellurium mixture, temperature equilibrium typically can be reached in about 2.5 hours, with a preferred equilibration time being about 3 hours, although the time employed for equilibration can be less provided that the objectives of the present invention are achieved. A preferred equilibration time for this step with this size vessel is about 3 hours. Smaller vessels and smaller amounts of material will not require as much time for equilibration. While there is no maximum time limit for this step, economic and time factors generally favor minimizing the equilibrating time.

Subsequent to equilibration at from about 500° C. to about 580° C., the mixture is maintained at this temperature and vigorously agitated to homogenize the mixture. During all of the previous and subsequent steps in the alloying process, the mixture is maintained in a quiescent state; agitation occurs only in this particular step. Agitation can be by any suitable method, such as by mechanical stirring with a propeller, by sparging (bubbling an inert gas such as nitrogen through the mixture), or the like. Agitation is performed for a period of from about 45 minutes to about 1.5 hours, preferably for about 1 hours.

When the agitation step is complete, agitation is ceased and the mixture is cooled in a quiescent state from the range of from about 500° C. to about 580° C. to the range of from about 425° C. to about 450° C. Preferably, the mixture is cooled to a temperature of about 440° C. Preferably, cooling is accomplished by removing the heat source and allowing the mixture to cool by heat loss from the vessel. The cooling time will depend on the size of the vessel and the amount of material in the vessel, with larger vessels and larger amounts of material requiring longer periods to cool. For example, for a quartz vessel containing 50 kilograms of selenium-tellurium mixture, a typical cooling time is from about 1 to about 2 hours, with a preferred cooling time being about 2 hours. While there is no maximum time limit for this step, economic and time factors generally favor minimizing the cooling time, although it is preferred that cooling not be accelerated by artificial means such as applying coolants to the vessel.

After cooling from the range of from about 500° C. to about 580° C. to the range of from about 425° C. to about 450° C., the mixture is maintained in a quiescent state at from about 425° C. to about 450° C. for a period of from about 4 hours to about 7 hours to allow the mixture to become further homogenized by heat agitation. Maintaining the mixture in a quiescent state at this temperature allows the mixture to relax the liquid structure; heat in the vessel during this period may allow "heat agitation" by means of thermal gradients throughout the mixture. Preferably, the mixture is maintained at this temperature for about 5 hours.

Thereafter, the mixture is further cooled from the range of from about 425° C. to about 450° C. to the range of from about 290° C. to about 350° C. while in a quiescent state. Preferably, cooling is accomplished by removing the heat source and allowing the mixture to cool by heat loss from the vessel. The cooling time will depend on the size of the vessel and the amount of material in the vessel, with larger vessels and larger amounts of material requiring longer periods to cool. For example, for a quartz vessel containing 50 kilograms of selenium-tellurium mixture, a typical cooling time is about 2 hours. While there is no maximum time limit for this step, economic and time factors generally favor minimizing the cooling time, although it is preferred that cooling not be accelerated by artificial means such as applying coolants to the vessel.

When the mixture has been cooled to from about 290° C. to about 350° C., it is removed from the reaction vessel. While not required, a preferred method of removal is to introduce the molten alloy into a shotting vessel, in which the molten alloy passes through orifices and is broken up into droplets that are then cooled by any suitable means, such as by falling into cool water (typically from about 15° to about 17° C., although the temperature can be outside of this range) to solidify into shots or beads. Preferably, the shots are then dried by removing them from the water and heating them at a temperature of from about 30° to about 45° C. (preferably about 40° C.) for a period of at least about 12 hours (preferably at least 48 hours). While not being limited by any theory, it is believed that this particular drying process may induce surface crystallization on the alloy shots, which provides nucleation sites on the shots to promote a more rapid and uniform crystallization step during melting of the shots in a vacuum coating apparatus.

While not being limited by any theory, it is believed that the quiescent alloying process of the present invention improves the electrophotographic performance of imaging members prepared from the alloy made by the present invention by producing an alloy with a relatively ordered structure compared to selenium-tellurium alloys prepared by nonquiescent alloying processes. It is believed that charge accumulation in the imaging member over the course of several charge/discharge cycles may result from charges becoming trapped within the alloy structure, particularly at areas of atomic or molecular irregularity, such as the end of a polymer chain. The process of the present invention, which minimizes agitation of the alloying mixture, is believed to result in longer molecular chains, thereby reducing the number of polymer chain ends within the composition and thus reducing the number of potential charge trapping sites within the alloy.

Alloys prepared according to the process of the present invention can be vacuum evaporated onto substrates to form imaging members. The imaging member substrate has an electrically conductive surface and is of an effective thickness, generally up to about 100 mils, and preferably from about 1 to about 50 mils, although the thickness can be outside of this range. The substrate can be opaque or substantially transparent and can comprise numerous suitable materials having the desired mechanical properties. The entire substrate can comprise the same material as that in the electrically conductive surface or the electrically conductive surface can merely be a coating on the substrate. Any suitable electrically conductive material can be employed. Typical electrically conductive materials include aluminum, titanium, nickel, chromium, brass, stainless steel, copper, zinc, silver, tin, and the like. The conductive layer can vary in thickness over substantially wide ranges depending on the desired use of the electrophotoconductive member. Generally, the conductive layer ranges in thickness from about 50 Angstroms to many centimeters, although the thickness can be outside of this range. When a flexible electrophotographic imaging member is desired, the thickness typically is from about 100 Angstroms to about 750 Angstroms. The substrate can be of any other conventional material, including organic and inorganic materials. Typical substrate materials include insulating nonconducting materials such as various resins known for this purpose including polyesters, polycarbonates, polyamides, polyurethanes, and the like. The coated or uncoated substrate can be flexible or rigid, and can have any number of configurations, such as a plate, a cylindrical drum, a scroll, an endless flexible belt, or the like. The outer surface of the supporting substrate preferably comprises a metal oxide such as aluminum oxide, nickel oxide, titanium oxide, and the like.

In some cases, intermediate adhesive layers between the substrate and subsequently applied layers may be desirable to improve adhesion. If such adhesive layers are utilized, they preferably have a dry thickness of from about 0.1 micron to about 5 microns, although the thickness can be outside of this range. Typical adhesive layers include film-forming polymers such as polyester, polyvinylbutyral, polyvinylpyrolidone, polycarbonate, polyurethane, polymethylmethacrylate, and the like as well as mixtures thereof. Since the surface of the supporting substrate can be a metal oxide layer or an adhesive layer, the expression "supporting substrate" as employed herein is intended to include a metal oxide layer with or without an adhesive layer on a metal oxide layer.

Any suitable photoconductive chalcogenide alloy including binary, tertiary, quaternary, and the like alloys can be employed in effective amounts as layers in the imaging member. For example, from about 40 grams to about 55 grams of alloy is typically an effective amount when preparing a 50 to 55 microns thick 4 inch by 6 inch alloy thin film to form a vacuum deposited photoconductive layer. Preferred alloys include alloys of selenium with tellurium, arsenic, or tellurium and arsenic with or without a halogen dopant. Typical photoconductive alloys of selenium include selenium-tellurium, selenium-arsenic, selenium-tellurium-arsenic, selenium-tellurium-chlorine, selenium-arsenic-chlorine, selenium-tellurium-arsenic-chlorine alloys, and the like. Photoconductive alloys of selenium are to be distinguished from stoichiometric compounds of selenium such as arsenic triselenide ($As_2Se_3$). As employed herein, a selenium alloy is defined as an intermetallic compound of selenium with other elemental additives where the ratios of constituents are inconsistent with stoichiometric compositions. Example of additional optional chalcogenide alloy layers include selenium or selenium alloy transport layers and/or protective overcoat layers. Generally, the selenium-tellurium alloy can comprise from about 5 percent by weight to about 40 percent by weight of tellurium and a halogen selected from the group consisting of up to about 70 parts per million by weight of chlorine and up to about 140 parts per million by weight of iodine all based on the total weight of the alloy with the remainder being selenium, although all of these amounts can be outside of the stated ranges. The selenium-arsenic alloy can comprise from about 0.01 percent by weight to about 35 percent by weight of arsenic and a halogen selected from the group consisting of up to about 200 parts per million by weight of chlorine and up to about 1000 parts per million by weight of iodine all based on the total weight of the alloy with the remainder being selenium, although all of these amounts can be outside of the stated ranges. The selenium-tellurium-arsenic alloy can comprise from about 5 percent by weight to about 40 percent by weight of tellurium, from about 0.1 percent by weight to about 5 percent by weight of arsenic, and a halogen selected from the group consisting of up to about 200 parts per million by weight of chlorine and up to about 1000 parts per million by weight of iodine all based on the total weight of the alloy with the remainder being selenium, although all of these amounts can be outside of the stated ranges. The expressions "alloy of selenium" and "selenium alloy" are intended to include halogen doped alloys as well as alloys not doped with halogen. When employed as a single photoconductive layer in an electrophotographic imaging member, the thickness of the photoconductive selenium alloy layer is typically from about 0.1 micron to about 400 microns thick, although the thickness can be outside of this range. Also, dopants can include metals such as thallium, iron, manganese, and the like in place of halogen. The aforementioned dopants are generally present in an amount of from about 10 to about 500 parts per million, and with halogen preferably in an amount of 10 to 200, and preferably about 10 to about 100 parts per million, although the amounts can be outside of these ranges.

Selenium-tellurium and selenium-tellurium-arsenic alloy photoconductive layers are frequently employed as a charge generation layer in combination with a charge transport layer. The charge transport layer is usually positioned between a supporting substrate and the charge generating selenium alloy photoconductive layer. Generally, a selenium-tellurium alloy comprises from about 60 percent by weight to about 95 percent by weight of selenium and from about 5 percent by weight to about 40 percent by weight of tellurium based on the total weight of the alloy, although the amounts can be outside of these ranges. The selenium-tellurium alloy can also comprise other components such as less than about 35 percent by weight of arsenic to minimize crystallization of the selenium and less than about 1000 parts per million by weight of halogen. In a more preferred embodiment, the photoconductive charge generating selenium alloy layer comprises from about 5 percent by weight to about 25 percent by weight of tellurium, from about 0.1 percent by weight to about 4 percent by weight of arsenic, and a halogen selected from the group consisting of up to about 100 parts per million by weight of chlorine and up to about 300 parts per million by weight of iodine, with the remainder being selenium. Compositions for optimum results are dictated by the application. It is desirable, in general, to achieve uniformly homogeneous compositions within the evaporated layers and to evaporate the alloy materials without significant fractionation. Elevated levels of tellurium can lead to excessive photoreceptor light sensitivity and high dark decay, and correspondingly reduced levels of tellurium can result in low light sensitivity and loss of copy quality. Elevated levels of arsenic, in some applications above about 4 percent by weight, can lead to high dark decay, to problems in cycling stability, and to reticulation of the photoreceptor surface. The resistance of amorphous selenium photoreceptors to thermal crystallization and surface wear can begin to degrade as the concentration of arsenic drops below about 1 percent by weight. As the chlorine content rises above about 70 parts per million by weight of chlorine, the photoreceptor can begin to exhibit excessive dark decay.

Any suitable selenium alloy transport layer can be utilized as a transport layer underlying a photoconductive selenium alloy charge generating layer. The charge transport material can, for example, comprise pure selenium, selenium-arsenic alloys, selenium-arsenic-halogen alloys, selenium-halogen, and the like. Preferably, the charge transport layer comprises a halogen doped selenium arsenic alloy. Generally, from about 10 parts by weight per million to about 200 parts by weight per million of halogen is present in a halogen doped selenium charge transport layer, although the amount can be outside of this range. If a halogen doped transport layer free of arsenic is utilized, the halogen content preferably is less than about 20 parts by weight per million. Inclusion of high levels of halogen in a thick halogen doped selenium charge transport layer free of arsenic can lead to excessive dark decay. Imaging members containing high levels of halogen in a thick halogen doped selenium charge transport layer free of arsenic are described, for example, in U.S. Pat. No. 3,635,705, U.S. Pat. No. 3,639,120, and Japanese Patent Publication No. J5 61 42-537, published June 6, 1981, the disclosures of each of which are totally incorporated herein by reference. Generally, halogen doped selenium arsenic alloy charge transport layers comprise from about 99.5 percent by weight to about 99.9 percent by weight of selenium, from about 0.1 percent to about 0.5 percent by weight of arsenic, and from about 10 parts per million by weight to about 200 parts per million by weight of halogen, the latter halogen concentration being a nominal concentration, although all of these amounts can be outside of the stated ranges. The expression "nominal halogen concentration" is defined as the halogen concentration in the alloy evaporated in the crucible. The charge transport layer is of an effective thickness, generally from about 15 microns to about 300 microns and preferably from about 25 microns to about 50 microns because of constraints imposed by the xerographic development system, constraints imposed by carrier transport limitations and for reasons of economics, although the thickness can be outside of these ranges. The expression "halogen materials" is intended to include fluorine, chlorine, bromine, and iodine. Chlorine is the preferred halogen because of the ease of handling and stability of chlorine in a vacuum deposited film (apparently due to lack of out diffusion). Transport layers are well known in the art. Typical transport layers are described, for example, in U.S. Pat. No. 4,609,605 and in U.S. Pat. No. 4,297,424, the disclosures of each of these patents being totally incorporated herein by reference.

If desired, an interface layer can be positioned between the transport layer and the charge generating photoconductive layer. The interface layer material can, for example, consist essentially of selenium and a nominal halogen concentration of from about 50 parts by weight per million to about 2,000 parts by weight per million of halogen material with the remainder comprising selenium. Minor additions of arsenic might be added but are generally relatively undesirable and may require additional halogen to compensate for this arsenic addition. The halogen concentration in the deposited interface layer will typically be somewhat less than that in the alloy evaporated in the crucible. In order to achieve optimal device properties, the actual halogen content in any final interface layer should normally be greater than about 35 parts by weight per million. Inclusion of high levels of halogen in thick halogen doped selenium layers free of arsenic can lead to excessive dark decay because dark decay is substantially a function of the total halogen in a multilayer imaging member. Imaging members containing high levels of halogen in a thick halogen doped selenium charge transport layer free of arsenic are described, for example, in U.S. Pat. No. 3,635,705, U.S. Pat. No. 3,639,120, and Japanese Patent Publication No. J5 61 42-537, published June 6, 1981, the disclosures of each of which are totally incorporated herein by reference. The use of interface layers is described in, for example, U.S. Pat. No. 4,554,230, the disclosure of which is totally incorporated herein by reference.

The particles of selenium alloy employed for vacuum evaporation to prepare imaging members can in general be in powder, shot (bead), or pellet form. However, the particles can also be in chunk or ingot form if so desired. Generally, to prepare shot (bead) particles, the components of the selenium alloy are combined by melting the selenium and additives together by any suitable conventional technique. The molten selenium alloy is then shotted by any suitable method. Shotting is usually effected by quenching molten droplets of the alloy in a coolant such as water to form large particles of alloy in the form of shot or beads. Shotting processes for forming alloy beads are well known and described, for example, in U.S. Pat. No. 4,414,179 to S. Robinette, the entire disclosure of this patent being incorporated herein by reference. The alloy beads typically have an average particle diameter of, for example, from about 300 microns to about 3,000 microns, although the particle size can be outside of this range. Pellet particles can be prepared from shot particles by grinding shot particles into a powder and thereafter compressing the powder into relatively large pellets. Pelletizing of the amorphous shotted alloy is frequently utilized as a means of controlling fractionation. The free flowing shot or pellets obtained by the multistep process of this invention can be readily weighed out and spread evenly in the crucibles to facilitate more uniform melting of the alloy and evaporation without splattering due to trapped gasses. Material in "chunk" or agglomerated form can present handling and weighing difficulties and difficulty in distributing the material evenly within the crucibles within the vacuum coater.

Where pellets are to be employed, the alloy beads, or combination of the alloy beads and minor amount of dust particles formed if vigorous mechanical abrasion of the alloy beads is employed, is rapidly ground in a conventional high speed grinder or attritor to form alloy particles typically having an average particle diameter of less than about 200 microns, although the particle size can be higher. Any suitable grinding device can be utilized to pulverize the bead particles to form the fine alloy particles. Typical grinders include hammer mills, jet pulverizers, disk mills, and the like. Depending upon the efficiency of the grinding device employed, grinding alloy beads to form alloy particles can normally be accomplished in less than about 5 minutes. Longer grinding times can be employed, if desired.

After grinding, the fine alloy particles are compressed by any suitable technique into large particles of alloy usually referred to as pellets typically having an average weight of from about 50 milligrams to about 1000 milligrams, although the weight can be outside of this range. A pellet weight greater than about 50 milligrams is generally preferred for ease of handling. When the pellet weight exceeds about 1000 milligrams, evaporation discontinuities may be observed. The pellets can be of any suitable shape. Typical shapes include cylinders, spheres, cubes, tablets, and the like. Compression of the alloy particles into pellets can be accomplished with any suitable device such as, for example, a simple punch tableting press, a multi-punch rotary tableting press, or the like.

The alloy prepared by the process of this invention can be deposited by any suitable conventional technique such as vacuum evaporation. The specific conditions vary depending upon the proportions of components in the different selenium alloy materials utilized. Typical temperature ranges for vacuum deposition are from about 300° C. to about 350° C. for alloys of Se-Te, from about 250° C. to about 350° C. for alloys of Se-As, and from about 300° C. to about 350° C. for alloys of Se-As-Te at a vacuum of between about $5 \times 10^{-4}$ torr and about $8 \times 10^{-5}$ torr for from about 10 minutes to about 25 minutes, although all of these values can be outside of the stated ranges. It is generally preferred that the substrate temperature be maintained in the range of from about 60° C. to about 85° C. during deposition.

When the selenium alloy deposited onto a substrate in the process of the present invention is the only photoconductive layer in the final imaging member, the selenium alloy can be vacuum deposited in a conventional manner except that the temperature profile used preferably rapidly ramps from a low temperature to a higher temperature, with final evaporation preferably being conducted as quickly as possible without splattering. Splattering causes surface defects. Steep temperature ramping further prevents selenium rich species from coming off first from the crucibles which, in turn, minimizes fractionation. The ramp profile depends upon whether the selenium alloy contains Te, As, or As and Te. Thus, the final evaporation is preferably conducted at the highest possible temperature without splattering. Typical temperature ranges for ramp heating are from an initial temperature of 20° C. to final temperature of 385° C. for alloys of Se-Te; an initial temperature of about 20° C. to a final temperature of about 450° C. for alloys of Se-As; and an initial temperature of about 20° C. to a final temperature of about 385° C. for alloys of Se-As-Te.

The first layer of multiple layered photoreceptors, such as a transport layer, can be deposited by any suitable conventional technique, such as vacuum evaporation. Thus, a transport layer comprising a halogen doped selenium-arsenic alloy comprising less than about 1 percent of arsenic by weight can be evaporated by conventional vacuum coating devices to form the desired thickness. The amount of alloy to be employed in the evaporation boats of the vacuum coater will depend on the specific coater configuration and other process variables to achieve the desired transport layer thickness. Chamber pressure during evaporation can be on the order of about $4 \times 10^{-5}$ torr. Evaporation is normally completed in about 15 to 25 minutes with the molten alloy temperature ranging from about 250° C. to about 325° C. Other times and temperatures and pressures outside these ranges can be used as well understood by those skilled in the art. It is generally preferred that the substrate temperature be maintained in the range of from about 50° C. to about 70° C. during deposition of the transport layer. Additional details for the preparation of transport layers are disclosed, for example, in U.S. Pat. No. 4,297,424, the disclosure of which is totally incorporated herein by reference.

Steep temperature ramp heating is desirable for every type of selenium alloy evaporation. Thus, for imaging members where the Se-Te alloy is in the last layer, a temperature ramp from 130° C. to about 385° C. in a period of about 15 minutes is typical. Generally, depending on the specific alloy composition employed, the final temperature ranges from about 300° C. to about 450° C. for Se-Te alloys.

The imaging members prepared by the process of the present invention can be selected for known imaging and printing processes as disclosed in, for example, U.S. Pat. No. 4,265,990, U.S. Pat. No. 4,544,618, U.S. Pat. No. 4,560,635, and U.S. Pat. No. 4,298,672, the disclosures of each of these patents being totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An alloy of selenium and tellurium was prepared as follows. To a 20 kilogram capacity quartz vessel was added 20 kilograms of a mixture of selenium shots (high purity grade, obtained from Canadian Copper Refiners, Montreal East, Canada) and tellurium shots (4-9's grade, obtained from Kawecki Beryl Company, New York, N.Y.), with the mixture comprising 11.3 percent by weight of tellurium and 88.7 percent by weight of selenium. A resistive heating mantle was placed around the quartz vessel and the vessel was heated to a temperature of about 300° C. over a period of about 2 hours with the mixture maintained in a quiescent state. The vessel was then maintained at about 300° C. for a period of about 1 hour to allow the mixture to equilibrate with respect to temperature while the mixture was maintained in a quiescent state. Thereafter, the mixture was heated to about 540° C. over a period of about 3 hours while in a quiescent state, after which the mixture was maintained at about 540° C. for about 3 hours while in a quiescent state to allow the mixture to equilibrate with respect to temperature. Subsequently, the mixture at 540° C. was agitated by sparging with nitrogen gas at a flow rate of about 3,000 cubic centimeters per minute for a period of about 1 hour. After the agitation step was completed, the mixture in a quiescent state was allowed to cool to a temperature of about 440° C. over a period of about 2 hours, and was then maintained in a quiescent state at about 440° C. for about 5 hours. Subsequently, the mixture in a quiescent state was cooled to a temperature of about 320° C. over a period of about 2 hours and was then fed through a shotting vessel to produce droplets of the molten alloy which dropped into water maintained at about 15° C. to form selenium-tellurium alloy shots. The shots were then dried by removing them from the water and heating them at a temperature of about 40° C. for a period of about 48 hours, resulting in dried selenium-tellurium shots (hereinafter referred to Alloy IA).

The process of Example I was repeated, resulting in formation of selenium-tellurium alloy shots (hereinafter referred to Alloy IB).

COMPARATIVE EXAMPLE

For comparison purposes, an alloy was prepared with the same composition as that prepared in Example I (11.3 percent by weight of tellurium and 88.7 percent by weight of selenium) by a non-quiescent process as follows. To a 20 kilogram capacity quartz vessel was added 20 kilograms of a mixture of selenium shots (high purity grade, obtained from Canadian Copper Refiners, Montreal East, Canada) and tellurium shots (4-9's grade, obtained from Kawecki Beryl Company, New York, N.Y.), with the mixture comprising 11.3 percent by weight of tellurium and 88.7 percent by weight of selenium. A resistive heating mantle was placed around the quartz vessel and the vessel was heated to a temperature of about 540° C. over a period of about 4 hours. When the temperature in the vessel exceeded 350° C., the mixture was continuously agitated by sparging with nitrogen gas. After the mixture reached a temperature of about 540° C., it was maintained at this temperature for about 18 hours while agitation by sparging was continued. Subsequently, the mixture was allowed to cool to a temperature of about 300° C. over a period of about 2 hours, after which agitation was ceased. The mixture at 300° C. was then fed through a shotting vessel to produce droplets of the molten alloy which dropped into water maintained at about 15° C. to form selenium-tellurium alloy shots (hereinafter referred to Alloy II).

EXAMPLE II

Imaging members were prepared from Alloy IA, Alloy IB, and Alloy II as follows. An alloy comprising about 99 percent by weight of selenium and about 1 percent by weight of arsenic doped with about 15 parts per million of chlorine was prepared by adding to a 20 kilogram capacity quartz vessel 19.2 kilograms of selenium shots (high purity grade, obtained from Canadian Copper Refiners, Montreal East, Canada), 0.2 kilogram of shots of an alloy comprising 90 percent by weight of selenium and 10 percent by weight of arsenic (prepared by mixing together 10 parts by weight of high purity arsenic granules, obtained from Asarco Company, with 90 parts by weight of high purity selenium shots, obtained from Canadian Copper Refiners, heating the mixture to a temperature of 480° C. to obtain a molten mixture, stirring the mixture mechanically while continuing to heat to 630° C., removing the heat source and ceasing stirring, after which the exothermic selenium-arsenic reaction maintained the temperature of the mixture at from about 630° to about 660° C. for about 30 minutes before the mixture began to cool naturally, cooling the mixture naturally to about 470° C., followed by feeding the resulting alloy at 470° C. through a shotting vessel to produce droplets of the molten alloy which are dropped into water maintained at about 15° C. to form shots), and 0.6 kilogram of shots of selenium containing 500 parts per million of chlorine (prepared by reacting selenium, obtained from Canadian Copper Refiners), with pure chlorine gas by bubbling the chlorine gas through the molten selenium at a temperature of about 425° C. for about 1 hour, cooling the resulting mixture to about 300° C., feeding the mixture through a shotting vessel to produce droplets of the chlorine doped selenium which are dropped into water maintained at about 15° C. to form shots, determining the concentration of chlorine in the shots, reheating the chlorine doped selenium shots together with pure selenium (in relative amounts that will result in a total chlorine concentration of 500 parts per million) at a temperature of about 425° C. for about 1 hour, cooling the resulting mixture to about 300° C., and feeding the mixture through a shotting vessel to produce droplets of the chlorine doped selenium which are dropped into water maintained at about 15° C. to form shots of selenium doped with 500 ppm of chlorine). A resistive heating mantle was placed around the quartz vessel and the vessel was heated to a temperature of about 400° C. over a period of about 1 hour. When the temperature in the vessel exceeded 350° C., the mixture was continuously agitated by mechanical stirring. After the mixture reached a temperature of about 400° C., it was maintained at this temperature for about 1 hour while agitation was continued. Subsequently, the mixture was allowed to cool to a temperature of about 300° C. over a period of about 1.5 hours, after which agitation was ceased. The mixture at 300° C. was then fed through a shotting vessel to produce droplets of the molten alloy which dropped into water maintained at about 15° C. to form shots of a selenium-arsenic alloy doped with chlorine.

Aluminum substrates comprising drums about 3 inches in diameter were then placed into a vacuum evaporation apparatus and shots of the alloy comprising about 99 percent by weight of selenium and about 1 percent by weight of arsenic doped with about 15 parts per million of chlorine were placed in stainless steel crucibles in the vacuum evaporation apparatus. The apparatus was pumped down to a pressure of about $4 \times 10^{-5}$ mm Hg and the crucibles containing the selenium-arsenic alloy were heated to a temperature of from about 250° to about 325° C. while the aluminum substrates were maintained at a temperature of from about 50° to about 70° C., resulting in formation of a selenium-arsenic layer about 55 microns thick on each aluminum substrate.

Thereafter, one of the coated aluminum substrates was placed in a vacuum evaporation apparatus. Selenium-tellurium shots of Alloy IA were first abraded and then ground into powder and formed into pellets by the process described in U.S. Pat. No. 4,780,386, the disclosure of which is totally incorporated herein by reference. The pellets were placed in stainless steel crucibles in the apparatus and the apparatus was pumped down to a pressure of about $4 \times 10^{-5}$ mm Hg and the crucibles containing the selenium-tellurium alloy were heated to a temperature of from about 275° to about 350° C. while the aluminum substrates were maintained at a temperature of about 70° C., resulting in formation of a selenium-tellurium layer about 5 microns thick on top of the selenium-arsenic layer. Another coated aluminum substrate was then placed into a vacuum evaporation apparatus and the process was repeated with selenium-tellurium pellets of Alloy IB. A third coated aluminum substrate was then placed into a vacuum evaporation apparatus and the process was repeated with selenium-tellurium pellets of Alloy II.

The members coated with Alloy IA, Alloy IB, and Alloy II, respectively, were then each positively charged with a corotron to about +1000 volts and discharged, with the charging and discharging being repeated 100 times at a rate of 30 cycles per minute (30 revolutions per minute at a constant current of 11.5 microamperes). Subsequently, the members coated with Alloy IA and Alloy IB were each negatively charged with a corotron to about −1000 volts and discharged, with the charging and discharging being repeated 100 times at a rate of 30 cycles per minute (30 revolutions per minute at a constant current of 11.5 microamperes). Thereafter, the three members were each positively charged with a corotron to about +1000 volts and discharged, with the charging and discharging being repeated 50 times at a rate of 30 cycles per minute (30 revolutions per minute at a constant current of 11.5 microamperes). After these cycles, the imaging members exhibited the following sensitivity at 560 nanometers wavelength of light, negative shock electrical residual voltage (NSEVR), and dark development potential (DDP) characteristics shown in Table 1:

TABLE 1

| Alloy | Sensitivity (at 560 nanometers wavelength) | NSEVR (volts) | DDP (volts) |
|---|---|---|---|
| IA | 232 | 236 | 928 |
| IB | 227 | 203 | 918 |
| II | 276 | 320 | 902 |

Sensitivity is a value specific to the wavelength of light employed, and is calculated by the following formula:

$$\frac{\text{Sensitivity}}{\text{Parameter}} = \frac{\sqrt{DDP\,(\text{volts})} - \sqrt{\text{Image Potential (volts)}}}{\text{Exposure of Image Potential (light intensity units)}}$$

Negative shock electrical residual voltage was measured with a Universal Scanner Trek Probe, available from Trek, Inc., Barker, N.Y. As can be seen from the data, the imaging members containing the alloys prepared by the process of the present invention exhibited significantly lower negative shock electrical residual voltage than the imaging member prepared by a non-quiescent process.

EXAMPLE III

Nine imaging members were prepared by preparing a selenium-tellurium alloy as described in Example I and vacuum evaporating the alloy onto aluminum drum substrates about 3 inches in diameter coated with a 55 micron thick layer of selenium-arsenic alloy comprising about 99 percent by weight of selenium and about 1 percent by weight of arsenic doped with about 15 parts per million of chlorine by the method described in Example II. The selenium-tellurium alloy was coated onto the selenium-arsenic alloy in a layer 5 microns thick. The nine imaging members were each first positively charged with a corotron to about +1000 volts and then discharged, with the charging and discharging being repeated 100 times at a rate of 30 cycles per minute (30 revolutions per minute at a constant current of 11.5 microamperes), followed by negatively charging the nine imaging members with a corotron to about −1000 volts and then discharging, with the charging and discharging being repeated 100 times at a rate of 30 cycles per minute (30 revolutions per minute at a constant current of 11.5 microamperes), and subsequently positively charging each imaging member with a corotron to about +1000 volts and then discharging, with the charging and discharging being repeated 50 times at a rate of 30 cycles per minute (30 revolutions per minute at a constant current of 11.5 microamperes). After these cycles, the imaging members exhibited negative shock electrical residual voltage values of from 44 volts to 93 volts. These negative shock electrical residual voltage values were well below the maximum desirable value for optimal copy quality of about 102 volts as measured by this method.

EXAMPLE IV

Seven imaging members were prepared by preparing a selenium-tellurium alloy as described in Example I and vacuum evaporating the alloy onto aluminum drum substrates about 3 inches in diameter coated with a 55 micron thick layer of selenium-arsenic alloy comprising about 99 percent by weight of selenium and about 1 percent by weight of arsenic doped with about 15 parts per million of chlorine by the method described in Example II. The selenium-tellurium alloy was coated onto the selenium-arsenic alloy in a layer 5 microns thick. The seven imaging members were then subjected to the 100 cycle positive charge-discharge, 100 cycle negative charge-discharge, 50 cycle positive charge-discharge procedure described in Example II, resulting in an average negative shock electrical residual voltage value as shown in the first row, second column of Table 2 below. Subsequently, the top 5 micron layer of selenium-tellurium alloy prepared according to the process of the present invention was removed with pumice. The resulting imaging members consisted solely of the aluminum base layer and the selenium-arsenic layer. The imaging members were then again subjected to the 100 cycle positive charge-discharge, 100 cycle negative charge-discharge, 50 cycle positive charge-discharge procedure, resulting in an average negative shock electrical residual voltage value as shown in the first row, third column of Table 2 below.

For comparison purposes, 30 imaging members were prepared by the same process except that the selenium-tellurium alloy was prepared as described in the Comparative Example above. These imaging members were then subjected to the 100 cycle positive charge-discharge, 100 cycle negative charge-discharge, 50 cycle positive charge-discharge procedure described in Example II, resulting in an average negative shock electrical residual voltage value as shown in the second row, second column of Table 2 below. Subsequently, the top 5 micron layer of selenium-tellurium alloy prepared according to the process of the present invention was removed with pumice. The resulting imaging members consisted solely of the aluminum base layer and the selenium-arsenic layer. The imaging members were then again subjected to the 100 cycle positive charge-discharge, 100 cycle negative charge-discharge, 50 cycle positive charge-discharge procedure, resulting in an average negative shock electrical residual voltage value as shown in the second row, third column of Table 2 below.

TABLE 2

| Top Layer Alloy | Total Photoreceptor NSEVR (average) (volts) | Base Layer NSEVR (average) (volts) | Screening Effect of Top Layer on NSEVR (average) (volts) | Number of Samples |
| --- | --- | --- | --- | --- |
| Example I | 62 | 184 | −122 | 7 |
| Comparative Example | 164 | 180 | −16 | 30 |

These data indicate that the presence of a 5 micron thick top layer of a selenium-tellurium alloy prepared according to the quiescent alloying process of the present invention significantly reduced the negative shock electrical residual voltage of the imaging members (as compared to the negative shock electrical residual voltage of the imaging members without the top selenium-tellurium alloy layer) by an average of 122 volts (first row, fourth column of Table 2 below). As can be seen from the data, the presence of a 5 micron thick top layer of a selenium-tellurium alloy prepared according to a non-quiescent alloying process reduced the negative shock electrical residual voltage of the imaging member (as compared to the negative shock electrical residual voltage of the imaging member without the top selenium-tellurium alloy layer) to a significantly lesser extent (an average of 16 volts-second row, fourth column of Table 2 below) than the 5 micron thick top layer of selenium-tellurium alloy prepared according to the process of the present invention.

Other embodiments and modifications of the present invention may occur to those skilled in the art subsequent to a review of the information presented herein; these embodiments and modifications, as well as equivalents thereof, are also included within the scope of this invention.

What is claimed is:

1. An alloying process which comprises, in the order stated (1) heating in a reaction vessel a mixture of selenium and tellurium from ambient temperature to from about 270° C. to about 330° C. while maintaining the mixture in a quiescent state; (2) maintaining the mixture at from about 270° C. to about 330° C. until the entire mixture has reached substantial equilibrium with respect to temperature while maintaining the mixture in a quiescent state; (3) subsequently heating the mixture from the range of from about 270° C. to about 330° C. to the range of from about 500° C. to about 580° C. while maintaining the mixture in a quiescent state; (4) maintaining the mixture at from about 500° C. to about 580° C. until the entire mixture has reached substantial equilibrium with respect to temperature while maintaining the mixture in a quiescent state; (5) thereafter maintaining the mixture at from about 500° C. to about 580° C. for from about 0.75 hour to about 1.5 hours while vigorously agitating the mixture; (6) subsequent to agitation, reducing the temperature of the mixture from the range of from about 500° C. to about 580° C. to the range of from about 425° C. to about 450° C. while maintaining the mixture in a quiescent state; (7) subsequently maintaining the temperature of the mixture at from about 425° C. to about 450° C. for from about 4 hours to about 7 hours while maintaining the mixture in a quiescent state; (8) reducing the temperature of the mixture from the range of from about 425° C. to about 450° C. to the range of from about 290° C. to about 350° C. while maintaining the mixture in a quiescent state; and (9) removing the mixture from the reaction vessel.

2. A process according to claim 1 wherein the mixture of selenium and tellurium is prepared by mixing together from about 5 to about 40 percent by weight of tellurium and from about 60 to about 95 percent by weight of selenium.

3. A process according to claim 1 wherein the mixture of selenium and tellurium is prepared by mixing together from about 10 to about 25 percent by weight of tellurium and from about 75 to about 90 percent by weight of selenium.

4. A process according to claim 1 wherein the mixture is heated from ambient temperature to a range of from about 270° C. to about 330° C. over a period of at least about 40 minutes.

5. A process according to claim 1 wherein the mixture is maintained in a quiescent state at a temperature of from about 270° C. to about 330° C. for a period of at least about 40 minutes.

6. A process according to claim 1 wherein the mixture is maintained in a quiescent state at a temperature of from about 270° C. to about 330° C. until the entire mixture exhibits a temperature range of no more than about 30° C.

7. A process according to claim 1 wherein the mixture is heated from the range of from about 270° C. to about 330° C. to the range of from about 500° C. to about 580° C. over a period of at least about 2.5 hours.

8. A process according to claim 1 wherein the mixture is maintained in a quiescent state at a temperature of from about 500° C. to about 580° C. for a period of at least about 2.5 hours.

9. A process according to claim 1 wherein the mixture is maintained in a quiescent state at a temperature of from about 500° C. to about 580° C. until the entire mixture exhibits a temperature range of no more than about 30° C.

10. A process according to claim 1 wherein subsequent to agitation the temperature of the mixture is reduced to from about 425° C. to about 450° C. over a period of at least about 1 hour.

11. A process according to claim 1 wherein the mixture is cooled from the range of from about 425° C. to about 450° C. to the range of from about 290° C. to about 350° C. over a period of at least about 2 hours.

12. A process according to claim 1 wherein the mixture is removed from the reaction vessel by introducing it while at a temperature of from about 290° C. to about 350° C. into a shotting apparatus to cause it to break up into droplets and allowing the droplets to cool, thereby forming shots.

13. A process according to claim 12 wherein the droplets are cooled by dropping into water and the resulting shots are dried by removing them from the water and heating them to a temperature of from about 30° C. to about 45° C. for at least about 12 hours.

14. A process for preparing an imaging member which comprises preparing an alloy of selenium and tellurium according to the method of claim 1 and vacuum evaporating the alloy thus prepared onto a substrate.

15. A process according to claim 14 wherein the mixture is removed from the reaction vessel by introducing it while at a temperature of from about 290° C. to about 350° C. into a shotting apparatus to cause it to break up into droplets and allowing the droplets to cool, thereby forming shots.

16. A process according to claim 15 wherein the droplets are cooled by dropping into water and the resulting shots are dried by removing them from the water and heating them to a temperature of from about 30° C. to about 45° C. for at least about 12 hours.

17. A process for preparing an imaging member which comprises vacuum evaporating onto a substrate a first layer of a first alloy of selenium and an alloying component selected from the group consisting of tellurium, arsenic, chlorine, and mixtures thereof, preparing a second alloy of selenium and tellurium according to the method of claim 1, and vacuum evaporating onto the first layer a second layer comprising the second alloy.

* * * * *